United States Patent [19]
Oda et al.

[11] Patent Number: 5,521,905
[45] Date of Patent: May 28, 1996

[54] ADAPTIVE TRAFFIC CONTROL APPARATUS AND METHOD FOR CONTROLLING CONNECTION OF ARRIVING CALLS

[75] Inventors: Toshikane Oda; Kazuhiko Yamanouchi, both of Saitama, Japan

[73] Assignee: Kakusai Denshin Denwa Co., Ltd., Tokyo, Japan

[21] Appl. No.: 277,509

[22] Filed: Jul. 19, 1994

[30] Foreign Application Priority Data

Jul. 22, 1993 [JP] Japan .................. 5-201310

[51] Int. Cl.$^6$ .................................. H04L 29/02
[52] U.S. Cl. .................. 370/17; 370/17; 370/60.1
[58] Field of Search ................. 370/13, 16, 16.1, 370/17, 60, 60.1, 94.1, 94.2, 58.1, 58.2, 58.3; 340/827; 395/181, 182.02, 183.16, 183.17

[56] References Cited

U.S. PATENT DOCUMENTS 5,040,171  8/1991  Osaki ..................... 370/17
5,072,440 12/1991  Isono et al. ............. 370/16
5,361,253 11/1994  Feijen et al. ........... 370/17
5,398,235  3/1995  Tsuzuki et al. ......... 370/16

*Primary Examiner*—Wellington Chin
*Attorney, Agent, or Firm*—Nikaido, Marmelstein, Murray & Oram

[57] ABSTRACT

Adaptive traffic control apparatus and method control connection of arriving calls in at least one circuit group in circuit-switched networks. The switching systems in general measure the number of calls in progress $n(t)$ at a time $t$ in the circuit group, where $t_0 \leq t \leq T$, $t_0$ is a traffic control initiation time and $T$ is a target time of the traffic control. In particular, an admissible number of calls $d(t)$ in the circuit group at the time t is calculated so that all the circuits of the group will be free by the target time $T$, and the measured number of calls in progress $n(t)$ is compared with the calculated admissible number of call $d(t)$ at each time a new call arrives at the circuit group to decide that the arriving new call is to be accepted if $n(t) < d(t)$ and that the arriving new call is to be rejected if $n(t) \geq d(t)$.

22 Claims, 9 Drawing Sheets

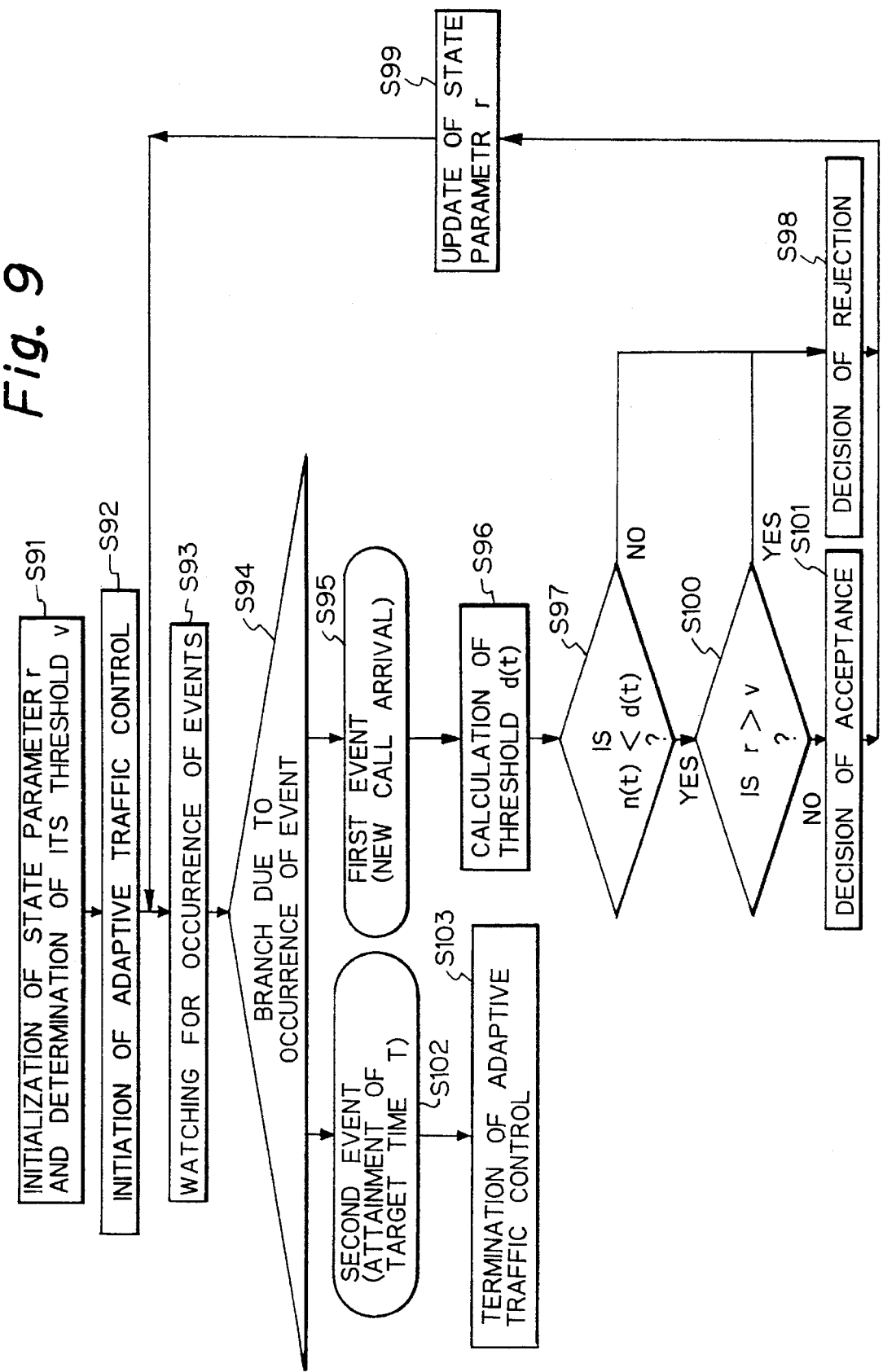

ADAPTIVE TRAFFIC CONTROL APPARATUS AND METHOD FOR CONTROLLING CONNECTION OF ARRIVING CALLS

BACKGROUND OF THE INVENTION

1. Field of the Invention

The present invention relates to an adaptive traffic control apparatus and method for controlling connection of arriving calls, utilized in circuit groups of capacity configurable networks such as public telecommunication networks or private telecommunication networks.

2. Description of the Related Art

In public telecommunication networks or in private telecommunication networks, dynamic network reconfiguration in topology and/or bandwidth has been utilized in practice. For example, a transmission path which has been allocated between a pair of switching nodes and used for supporting a circuit-switched network (for example, telephone network, ISDN) may be reallocated to different pair of nodes temporarily to operate the network cost-effectively and adaptively to time-varying traffic demand. A conventional method for reconfiguring networks is a manual operation, in which a target network element, for example, a transmission path between a pair of nodes is put into a maintenance busy state by off-line manual procedure, and then reallocated to another pair of nodes. In the current networks, such a network reconfiguration may be carried out automatically by a software controlled technique implemented in digital cross-connects and switching systems.

Rearrangement within a logical network is also in the category of network reconfiguration. For example, in a circuit-switched network in which calls are served primarily on and on-demand basis, a part of circuit group in the network may be temporarily assigned to call on a reserved basis if the circuit connection for the call has been requested by user and reserved in the network beforehand, and sufficient idle capacity is available for the reserved call at the beginning of the call. This type of network operation may be performed by manual or by software controlled techniques.

In general, in order to reconfigure a network, whether it is physical or logical, it is necessary that the circuit group the network that is targeted to reallocate is entirely idle at the time of reallocation. This means that no calls should remain in progress at the target circuit group at the target time. A conventional method to achieve this requirement is to make the entire circuit group busy prior to the target time so that all the calls in progress may be released before the time, or to execute a forced cut off on the calls in progress.

Making a circuit or circuit group busy for the network operation and maintenance purpose is often referred to as circuit blocking. The circuit blocking is a traffic control technique for rejecting arriving calls to a target circuit or circuit group and releasing calls in progress by the event of call termination for a certain period of time so as to reduce the number of simultaneously connected calls at the scheduled time toward a desired value, for example, to zero. According to the conventional circuit blocking technique, all the calls arriving at the target group from a predetermined initiation time to a target time are rejected without reserve. This time period between the initiation and target time is set with a fixed length which may be predetermined in accordance with statistical nature of calls, the configuration of the target circuit group, and a requested condition on the number of remaining calls at the target time. The longer time period is, the higher the success probability for restricting the number of remaining calls at the target time less than the requested number. In practice, the circuit blocking is initiated sufficiently before the target time by taking account of the target circuit group and the worst case, namely the case where all the circuits are occupied by calls at the beginning of call rejection period.

According to the conventional circuit blocking technique using the call rejection period with a fixed length, however, even if there remain sufficient idle circuits for accepting several new calls at the beginning stage of the call rejection period by chance, all the arriving calls are rejected ignoring such a chance. This will invite unnecessary decrease in circuit utilization.

SUMMARY OF THE INVENTION

It is therefore an object of the present invention to provide an adaptive traffic control apparatus and method for controlling connection of arriving calls, which can reduce unnecessary rejections of the calls to prevent unnecessary decrease in circuit utilization.

The present invention relates to an adaptive traffic control apparatus and method for controlling connection of arriving calls in at least one circuit group in switching networks. The switching networks in general measures the number of calls in progress $n(t)$ at a time t in the circuit group, where $t_0 \leq t \leq T$, $t_0$ is a traffic control initiation time and T is a target time of the traffic control. According to the present invention, in particular, an admissible number of calls $d(t)$ in the circuit group at the time t is calculated so that all the circuits of the group will be free by the target time T, and the measured number of calls in progress $n(t)$ is compared with the calculated admissible number of call $d(t)$ at each time a new call arrives at the circuit group to decide that the arriving new call is to be accepted if $n(t) < d(t)$ and that the arriving new call is to be rejected if $n(t) \geq d(t)$.

Namely, according to the present invention, the numbers of admissible calls at points in time before the target time for a given success probability are derived, and then a new arriving call is allowed to connect as far as the number of calls in progress is less than the derived admissible number at that time.

Strategy A

If it is known beforehand or it can be assumed practically that the call arrival at a group of N (N is an integer greater than one) circuits is Poissonian with rate $\lambda$ during the interval from the initiation time $t_0$ to the a target time T and also the service time is exponentially distributed with service rate $\mu$, the traffic control for single traffic type will be carried out based upon the following principles.

Differential-difference equations with respect to a transitional probability $P(t,n)$ that n calls are in progress at an arbitrary time t for single traffic type are given as $$\frac{\partial P(t,0)}{\partial t} = -\lambda z(t,0)P(t,0) + \mu P(t,1),$$

for $n = 0$, $t_0 \leq t \leq T$, $$\frac{\partial P(t,n)}{\partial t} = \lambda z(t,n-1)P(t,n-1) - \{\lambda z(t,n) + n\mu\}P(t,n) + (n+1)\mu P(t,n+1),$$

for $1 \leq n < N$, $t_0 \leq t \leq T$,

-continued $$\frac{\partial P(t,N)}{\partial t} = \lambda z(t,N-1)P(t,N-1) - N\mu P(t,N),$$

for $n = N$, $t_0 \leq t \leq T$, $$\sum_{n=0}^{N} P(t,n) = 1, \text{ for } t_0 \leq t \leq T,$$

where the policy $z(n,t)$ is given by $z(n,t)=0$ when $n \leq d(t)$ $z(n,t)=1$ otherwise.

Thus, a success probability $P(T,0)$ that no call remains in progress at the target time $T$ ($>t_0$) is given by a solution of the above differential-difference equations. The threshold $d(t)$ can be determined so as to maximize an object function such as expected traffic carried during the interval from the initiation time $t_0$ to the target time $T$ under a condition of $P(T,0) \leq Q$, where $Q$ is a predetermined value of $0<Q<1$.

The determination of the threshold for the ease of multiple traffic type can be carried out with the similar manner.

The number of calls in progress $n(t)$ at a time $t$ is compared with the threshold $d(t)$ each time a new call arrives at the circuit group during $t_0 \leq t \leq T$ to derive the policy $z(n,t)$.

Strategy B

Regardless of call arrival process, if it is practically assumed that the service time is exponentially distributed with service rate $\mu$, the traffic control for single traffic type will be carried out based upon the following principles.

A success probability $P(t,0:t_0,n)$ that $n$ calls are in progress at the initiation time $t_0$ and then all the calls are released at an arbitrary time $t$ ($>t_0$) is given by a product of the probabilities that each of the $n$ calls terminates at time $t$, namely by $[1-\exp\{-(t-t_0)\mu\}]^n$. The threshold $d(t)$ can be determined as the positive maximum integer $n$ satisfying a condition of $P(t,0:t_0,n) \leq Q$, irrespective of Poissonian arrival of the calls or not, where $Q$ is a predetermined value of $0<Q<1$.

The determination of the threshold for the case of multiple traffic type can be carried out with the similar manner.

The number of calls in progress $n(t)$ at a time $t$ is compared with the threshold $d(t)$ each time a new call arrives at the circuit group during $t_0 \leq t \leq T$. In this strategy, however, once it is judged as $n(t)+1 \geq d(t)$, only the arrived call at this time $t$ will be accepted but all the arriving calls after that time till the target time $T$ will be rejected without reserve.

It should be noted that the threshold $d(t)$ derived by the strategy A will not always coincide with the threshold $d(t)$ derived by the strategy B. The threshold for the traffic control based upon the strategies A and B may be determined by adding a certain safety margin to calculated thresholds, respectively.

It is preferred that a plurality of admissible numbers of calls $d(t)$ in the circuit group at points of time from the traffic control initiation time $t_0$ to the target time $T$ is calculated beforehand, and that the calculated admissible numbers of calls is stored in a memory as a threshold table.

It is also preferred that an admissible number of calls $d(t)$ in the circuit group at a time $t$ is calculated every time a new call arrives.

The admissible number of calls $d(t)$ in the circuit group at the time $t$ may be calculated so that all the circuits of the group will be free by the target time $T$, with satisfying a success probability depending upon both an average service time of one call and the number of arriving calls during a unit of time in ease that the call arrival, during the interval from the traffic control initiation time $t_0$ to the target time $T$ is regarded as Poissonian.

The admissible number of calls $d(t)$ in the circuit group at the time $t$ may be calculated so that all the circuits of the group will be free by the target time $T$, with satisfying a success probability depending upon only an average service time of one call. In this case, all arriving calls are rejected without reserve after a time once the arriving new call is decided to be rejected.

It is preferred that all arriving calls are rejected without reserve after a time that a state parameter $r$ exceeds a predetermined threshold $v$.

In the above case, the state parameter $r$ may be updated every time a new call arrives at the circuit group, every time a rejection of the arriving call is decided, or every time an acceptance of the arriving call is decided.

The state parameter $r$ may be an elapsed time period from the initiation time $t_0$.

Further objects and advantages of the present invention will be apparent from the following description of the preferred embodiments of the invention as illustrated in the accompanying drawings.

BRIEF DESCRIPTION OF THE DRAWINGS

FIG. 9 shows a flow chart of a control algorithm according to the embodiment shown in FIG. 8.

DESCRIPTION OF THE PREFERRED EMBODIMENTS

Figure 1:
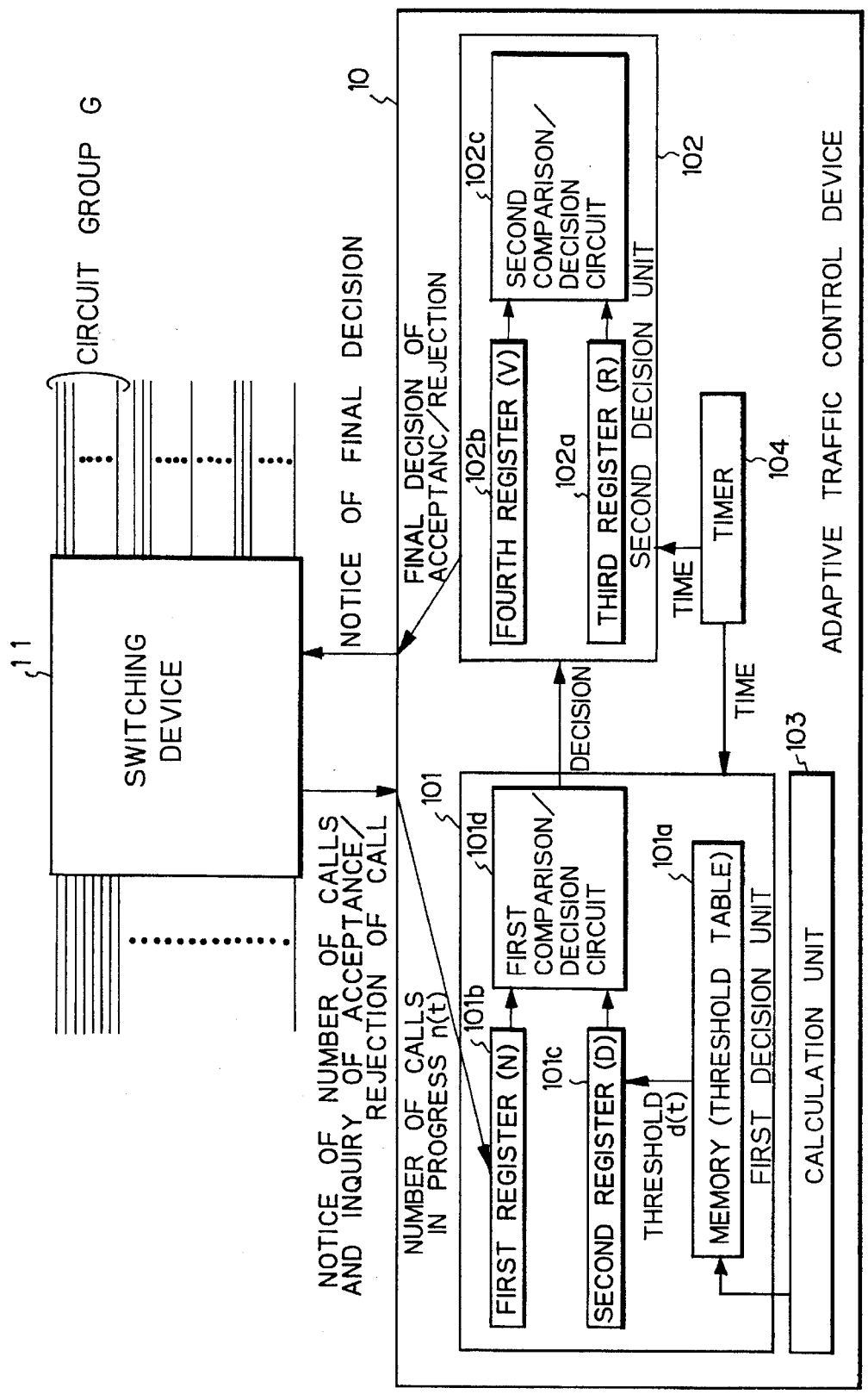
FIG. 1 shows a block diagram of a preferred embodiment of an adaptive traffic control apparatus according to the present invention.

In FIG. 1 which shows a schematic constitution of an adaptive traffic control apparatus as a preferred embodiment according to the present invention, a reference numeral 10 denotes the adaptive traffic control apparatus connected to a switching device 11 adapted for a plurality of circuit groups including a target circuit group G. The adaptive traffic control apparatus 10 in this embodiment is substantially constituted by a first decision unit 101 for determining rejection/acceptance of each call arrived at the target circuit group G, a second decision unit 102 for determining rejection of all the calls, a calculation unit 103 for calculating admissible number of calls, or thresholds, at the points of time before the target time, and a timer 104.

The first decision unit 101 has a memory 101a for storing a table of the admissible number of calls provided from the calculation unit 103, a first register (N) 101b for temporally storing the number of calls in progress n(t) at an arbitrary time t provided from the switching device 11, a second register (D) 101c for temporally storing the admissible number of calls d(t) at the arbitrary time t, which was read out from the memory 101a, and a first comparison/decision circuit 101d for comparing the contents in the first and second registers 101b and 101c.

The second decision unit 102 has a third register (R) 102a for temporally storing a state parameter r used for deciding the rejection of all the calls, a fourth register (V) 102b for temporally storing an upper bounding threshold v of the parameter r, and a second comparison/decision circuit 102c for comparing the contents in the third and fourth registers 102a and 102b.

Figure 2:
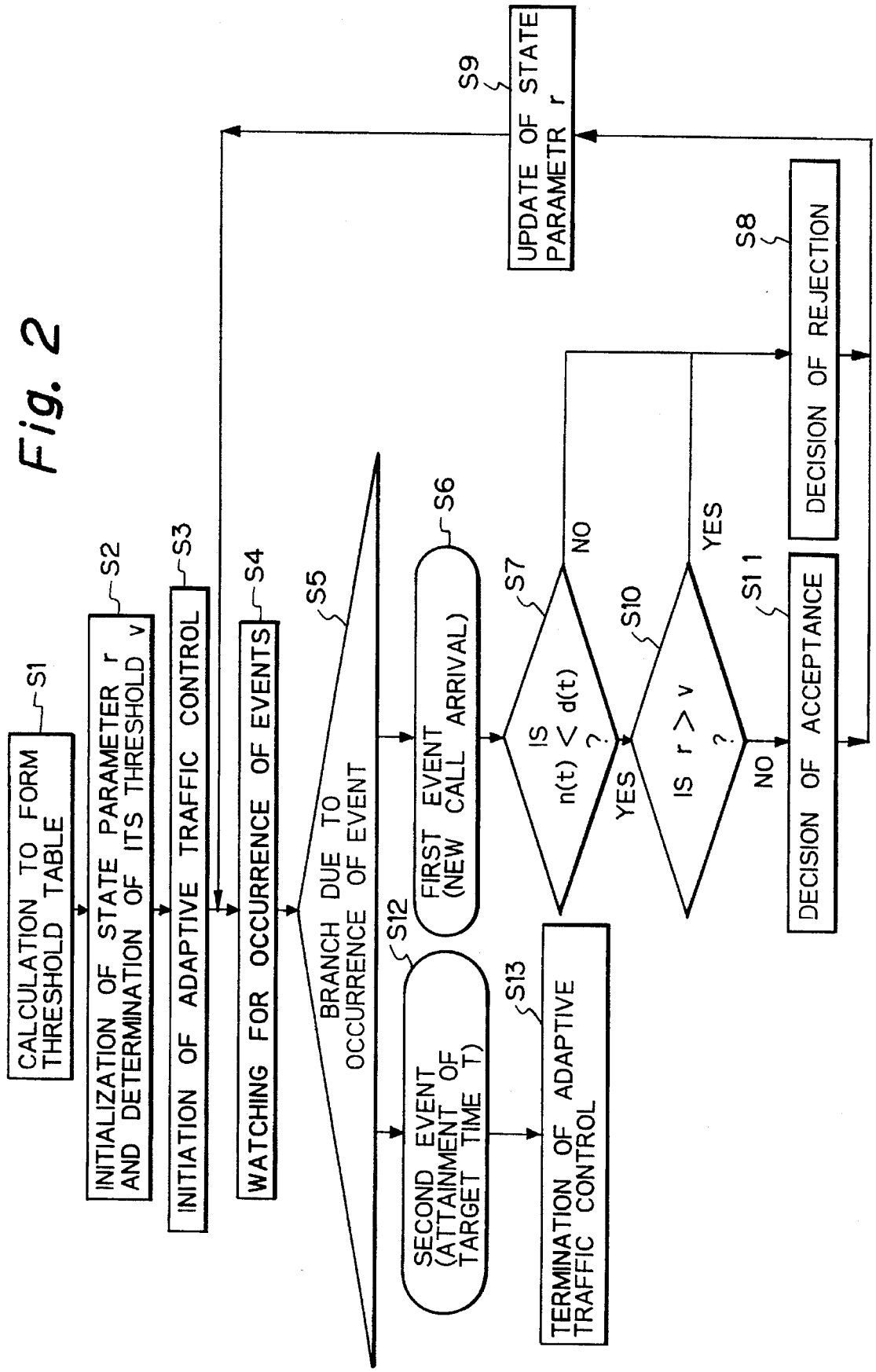
FIG. 2 shows a flow chart of a control algorithm according to the embodiment shown in FIG. 1.

Operation of this embodiment will be described in detail with reference to FIG. 2 which shows a flow chart of a control algorithm of this embodiment.

At first, the target circuit group G and the target time T are set in the control device 10. Then, the calculation unit 103 calculates admissible numbers of calls, or thresholds, d(t) at the respective points of time t from the initiation time $t_0$ to the target time T so that a probability of the number of calls (n(T)) at the target time T is controlled to (n(T))=(j) where j is zero or a positive integer (step S1). The calculated thresholds d(t) are stored in the memory 101a in the first decision unit 101 as a threshold table shown below (Table 1). The above calculation for producing the threshold table can be carried out or modified any time before the time t.

TABLE 1

| Interval number | Time interval | Threshold d(t) |
|---|---|---|
| 1 | $s(0) = t_0 \leq t < s(1)$ | b(1) |
| 2 | $s(1) \leq t < s(2)$ | b(2) |
| 3 | $s(2) \leq t < s(3)$ | b(3) |
| ⋮ | ⋮ | ⋮ |
| m | $s(m-1) \leq t < s(m)$ | b(m) |
| ⋮ | ⋮ | ⋮ |
| M − 1 | $s(M-2) < t < s(M-1)$ | b(M − 1) |
| M | $s(M-1) \leq t < s(M) = T$ | b(M) |

If it is known beforehand or it can be assumed practically that the call arrival at the target circuit group G is Poissonian with rate λ during the interval from the initiation time $t_0$ to the target time T, the thresholds will be calculated based upon the aforementioned strategy A. Regardless of call arrival process, if it is practically assumed that the service time is exponentially distributed with service rate μ, the thresholds will be calculated based upon the aforementioned strategy B.

Next, the state parameter r used for deciding the rejection of all the calls is initialized, and the upper bounding threshold v of the parameter r determined beforehand to a proper value (step S2). Then, the adaptive traffic control is initiated (step S3). This traffic control initiation time is indicated as $t_0$. Thereafter, occurrence of events is watched (step S4).

There are two possible types of the events (first and second events) in this embodiment. Namely, the first event is a new call arrival and the second event is the attainment of a target time T. If a new call is arrived at the switching device 11 at an arbitrary time t ($t_0 \leq t \leq T$), namely if the first event occurs, this switching device 11 informs the adaptive traffic control device 10 of this arrival of the call and the number of calls in progress n(t) in the target circuit group G which is connected to the device 11 and subjected to control its calls (steps S5 and S6). Also the switching device 11 inquires the adaptive traffic control device 10 whether this new call should be accepted or rejected. It should be noted that the switching device 11 always knows the number of calls in progress n(t) in the circuit group G as well as an ordinary automatic switching device.

When an inquiry of rejection/acceptance of the new arriving call is received, the adaptive traffic control device 10 sets the number of calls in progress n(t) at the time t in the circuit group G into the first register 101b in the first decision unit 101. The decision unit 101 reads out a threshold, or an admissible number, of calls d(t) at that time t in the target circuit group G from the threshold table in the memory 101a and stores the read-out threshold d(t) into the second register 101c. The first comparison/decision circuit 101d compares the content n(t) in the first register 101b with the content d(t) in the second register 101c, and decides as follows in accordance with the comparison (step S7). If n(t)<d(t), the arriving call is to be accepted, and if n(t)≦d(t), the arriving call is to be rejected. This decision of the acceptance/rejection is informed to the second decision unit 102.

If the decision is the rejection of the call, the second decision unit 102 informs the switching device 11 of this decision of rejection as a final decision (step S8). Then, the state parameter r is updated, namely incremented (step S9). This state parameter r is resident in the third register 102a.

If the decision from the first decision unit 101 is the acceptance of the call, the comparison/decision circuit 102c in the second decision unit 102 compares the state parameter r stored in the third register 102a with the upper bounding threshold v stored beforehand in the fourth register 102b, and decides as follows in accordance with the comparison (step S10). If r≦v, the arriving call is to be accepted (step S11), and this decision of the acceptance is informed to the switching device 11 as a final decision. If r>v, it is decided that all the arriving call is to be rejected (step S8). Namely, after this time t to the target time T, all the arriving calls are rejected without reserve. This decision of the rejection is also informed to the switching device 11 as a final decision.

If the time t reaches the target time T (step S12), namely if the second event occurs, the above-mentioned adaptive traffic control is terminated (step S13).

The upper bounding threshold v of the state parameter r can be determined optionally. However, in the strategy B, this threshold is determined to v=0 and the state parameter is initialized to r=1. Namely, once it is judged as n(t)+ 1≧d(t), only the arrived call at this time t will be accepted but all the arriving calls after that time till the target time T will be rejected without reserve.

If it is desired that the decision for the rejection of all the arriving calls without reserve is performed depending upon a plurality of factors, the state parameter r and the threshold v should be defined as vectors constituted by a plurality of the factors, and the state parameter value and its threshold value with respect to a specified factor or factors should be compared with each other.

In the aforementioned embodiment, the state parameter r is updated, or incremented, every time a new call arrives. However, in a modification of the embodiment, this state parameter r may be updated only when a rejection of a new arriving call is decided. In this case, the step S9 should be executed Just after the step S8. The state parameter r may be updated only when an acceptance of a new arriving call is decided. In this case, the step S9 should be executed just after the step S11.

Figure 3:
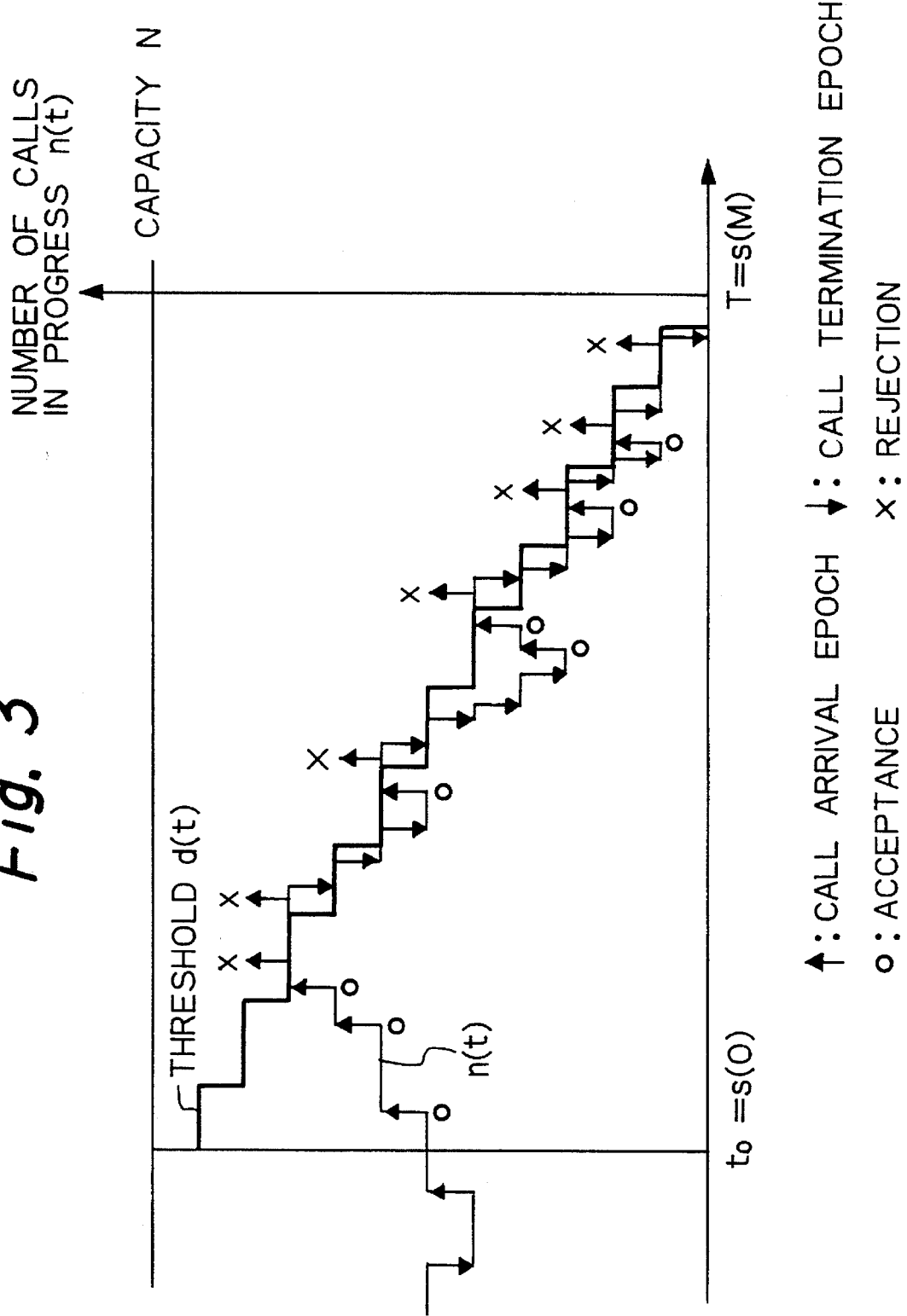
FIG. 3 shows an example of variations of the number of calls in progress and of its threshold with respect to time t.

FIG. 3 shows an example of variations of the number of calls in progress and of its threshold with respect to time t in a switching circuit group for single traffic type.

If a new call is arrived at the circuit group G with a circuit number (capacity) of N and thus one of free circuits in the group G is occupied at a time t, the number of calls in progress n(t) at the time t is increased by one. Contrary to this, if one of n(t) calls in progress terminates, the number of calls in progress n(t) at that time is decreased by one. At each time a new call arrives at this circuit group G, the number of calls in progress n(t) at this time t is compared with the threshold d(t) at this time t. As aforementioned, the thresholds d(t) at the points of time from $t_0$ to T are calculated beforehand and stored in the memory 101a as the threshold table shown in Table 1. In FIG. 3, the threshold d(t) is indicated by a heavy line. As will be apparent from FIG. 3 in which the threshold d(t) is indicated by a heavy line, it is judged that the arriving call is accepted if n(t)<d(t) and that the arriving call is rejected if n(t)≧d(t). It should be noted that, according to this example, the above judgment is continued from the initiation time $t_0$ to the target time T. Namely, in this example, the upper bounding threshold v of the state parameter r used for deciding the rejection of all the calls is determined beforehand to a value larger than a possible upper value of the state parameter r.

Figure 4:
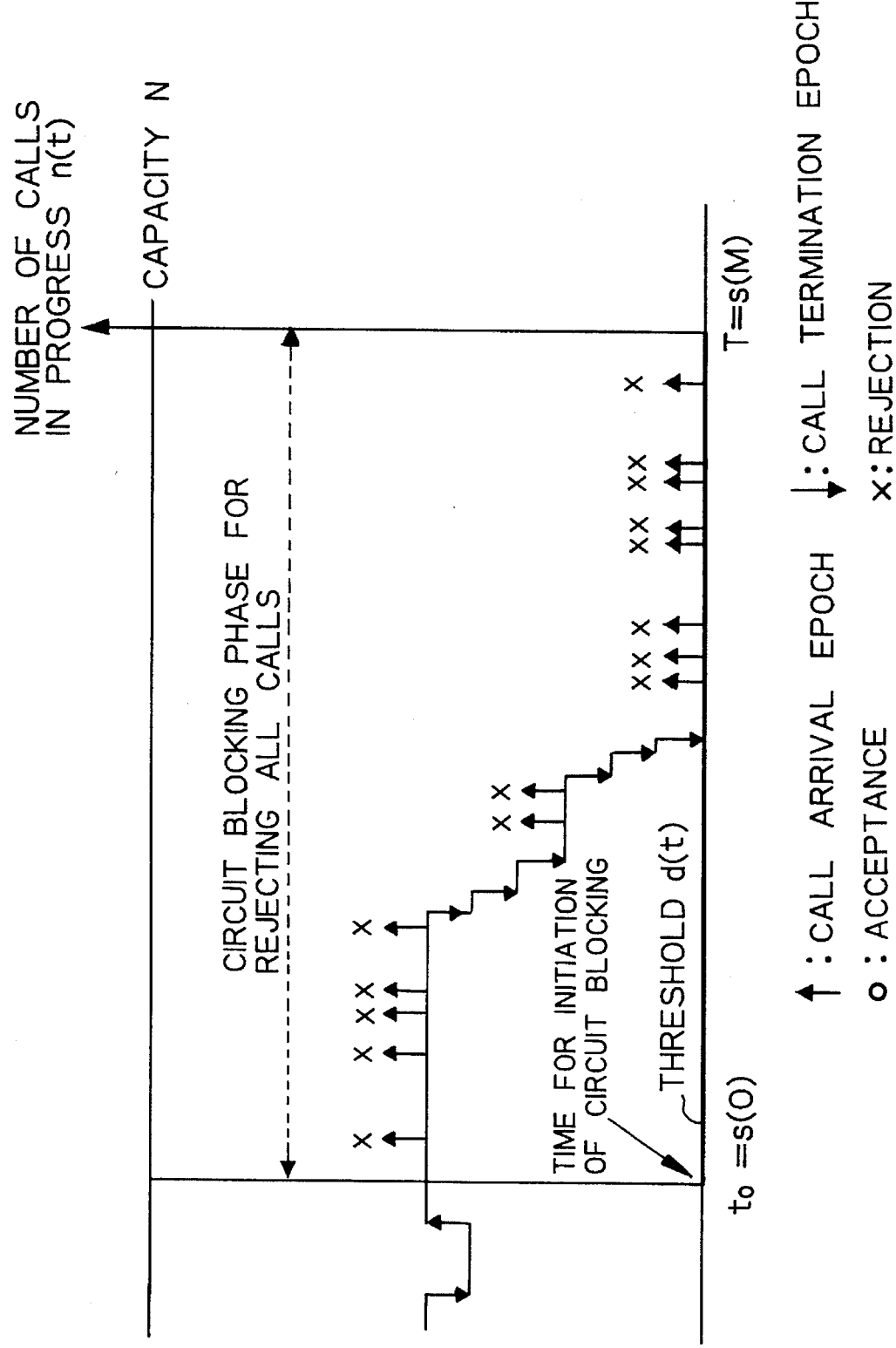
FIG. 4 shows a variation of the number of calls in progress with respect to time t according to a conventional traffic control method.

FIG. 4 shows a variation of the number of calls in progress with respect to time t according to the conventional traffic control method For rejecting all the arriving calls From the control initiation time till the target time. Namely, in the conventional method, a threshold table is formed as shown below (Table 2).

TABLE 2

| Interval number | Time interval | Threshold d(t) |
|---|---|---|
| 1 | $s(0) = t_o \leq t < s(1)$ | b(M) |
| 2 | $s(1) \leq t < s(2)$ | b(M) |
| 3 | $s(2) \leq t < s(3)$ | b(M) |
| ⋮ | ⋮ | ⋮ |
| m | $s(m-1) \leq t < s(m)$ | b(M) |
| ⋮ | ⋮ | ⋮ |
| M − 1 | $s(M-2) \leq t < s(M-1)$ | b(M) |
| M | $s(M-1) \leq t \leq s(M) = T$ | b(M) |

As will be apparent from a comparison of FIG. 3 with FIG. 4, according to this embodiment, acceptance and rejection of an arriving call can be selectively and adaptively controlled depending upon a connection state in the circuit group at each time whereas greater number of calls can be accepted than the conventional method. As a result, unnecessary rejections of the calls can be reduced to prevent unnecessary decrease in circuit utilization.

Figure 5:
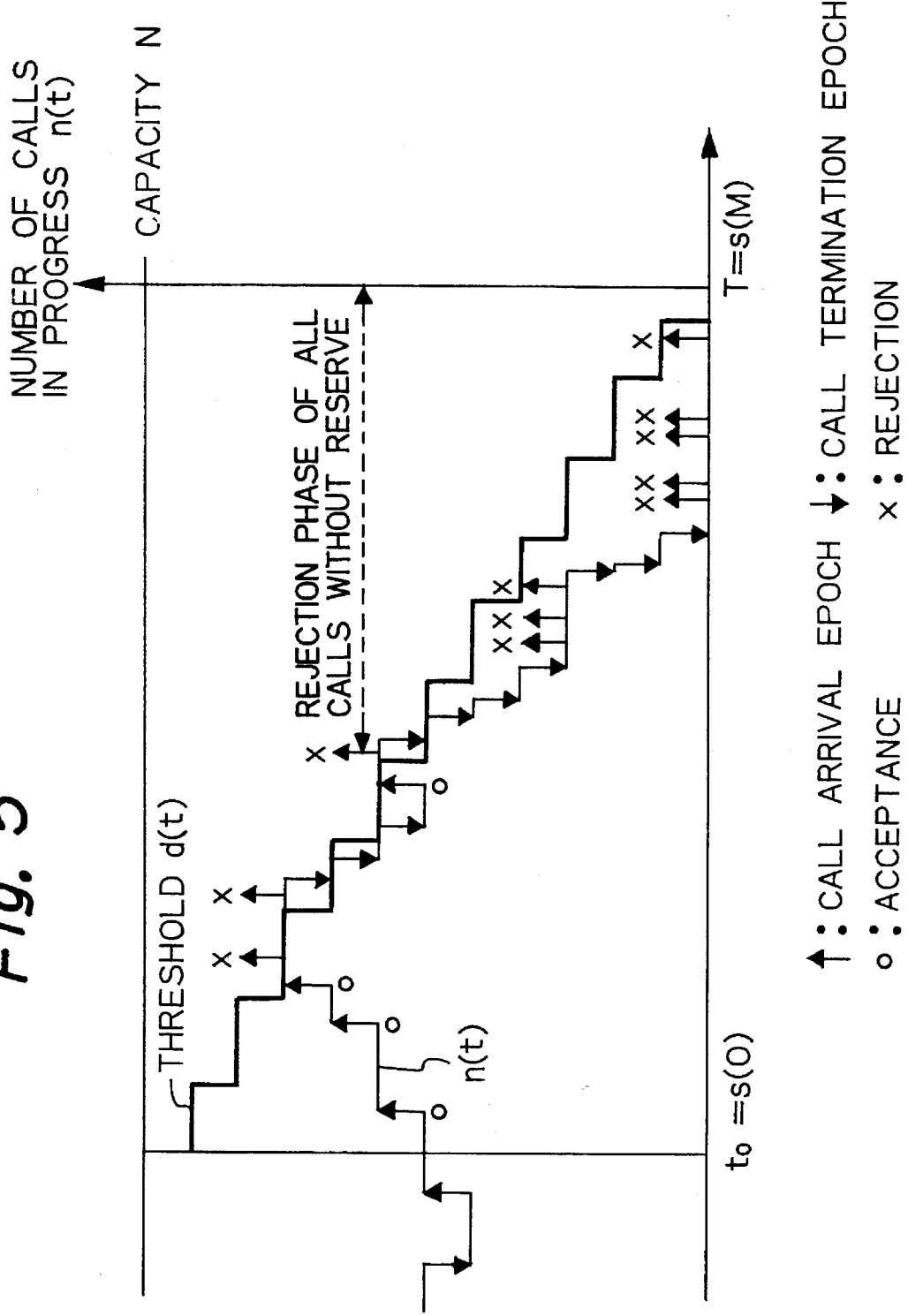
FIG. 5 shows an another example of variations of the number of calls in progress and of its threshold with respect to time t.

FIG. 5 shows an another example of variations of the number of calls in progress and of its threshold with respect to time t in a switching circuit group for single traffic type.

In this example, all the arriving calls from a time of a third rejection after the control initiation time $t_0$ are rejected without reserve. Namely, in this example, the upper bounding threshold v of the state parameter r used for deciding the rejection of all the calls is determined beforehand to v=2. At each time a new call arrives at this circuit group, the number of calls in progress n(t) at this time t is compared with the threshold d(t) at this time t. As aforementioned, the thresholds d(t) at the points of time from $t_0$ to T are calculated beforehand and stored in the memory 101a as the threshold table shown in Table 1. As will be apparent from FIG. 5 in which the threshold d(t) is indicated by a heavy line, it is judged that the arriving call is accepted if n(t)<d(t) and that the arriving call is rejected if n(t)≧d(t). However, if r>v(=2), all the arriving calls from this time till the target time T are rejected without reserve. Thus, as well as the example of FIG. 3, acceptance and rejection of an arriving call can be selectively and adaptively controlled depending upon a connection state in the circuit group at each time whereas greater number of calls can be accepted than the conventional traffic control method. As a result, unnecessary rejections of the calls can be reduced to prevent unnecessary decrease in circuit utilization.

Figure 6:
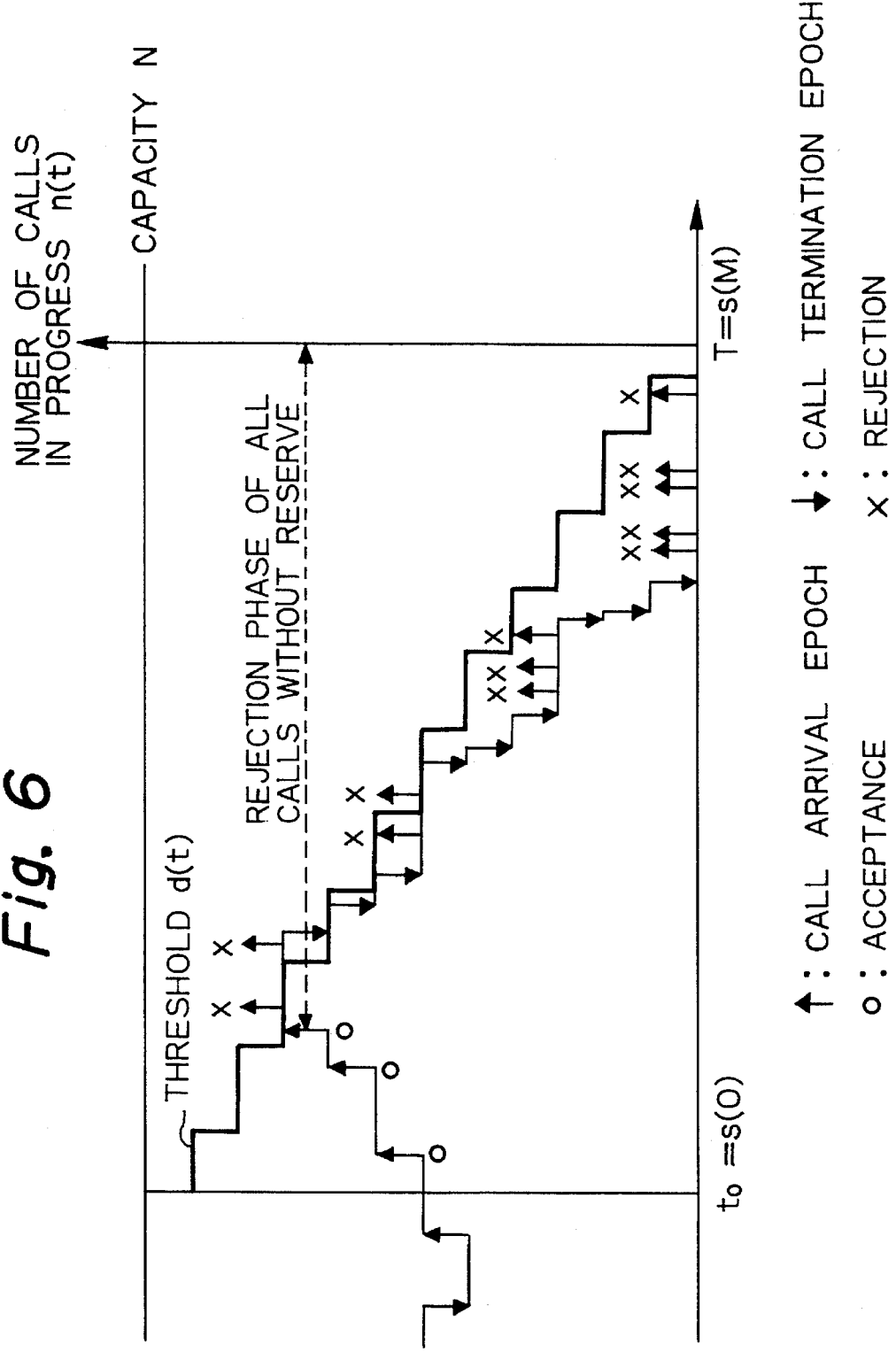
FIG. 6 shows a still another example of variations of the number of calls in progress and of its threshold with respect to time t.

FIG. 6 shows a still another example of variations of the number of calls in progress and of its threshold with respect to time t in a switching circuit group for single traffic type.

In this example, all the arriving calls from a time of a first rejection after the control initiation time $t_0$ are rejected without reserve. Namely, in this example, the upper bounding threshold v of the state parameter r used for deciding the rejection of all the calls is determined beforehand to v=0. As mentioned before, if the thresholds are calculated in accordance with the strategy B, this traffic control method of FIG. 6 is implemented. Of course, in case of using the strategy A, this method of FIG. 6 may be adopted. At each time a new call arrives at this circuit group, the number of calls in progress n(t) at this time t is compared with the threshold d(t) at this time t. The thresholds d(t) at the points of time from $t_0$ to T are calculated beforehand and stored in the memory 101a as the threshold table shown in Table 1. As will be apparent from FIG. 6 in which the threshold d(t) is indicated by a heavy line, it is Judged that the arriving call is accepted if n(t)<d(t) and that the arriving call is rejected if n(t)≧d(t). However, if r>v(=0), all the arriving calls from this time till the target time T are rejected without reserve. Thus, as well as the examples of FIGS. 3 and 5, acceptance and rejection of an arriving call can be selectively and adaptively controlled depending upon a connection state in the circuit group at each time whereas greater number of calls can be accepted than the conventional traffic control method. As a result, unnecessary rejections of the calls can be reduced to prevent unnecessary decrease in circuit utilization.

The above-mentioned embodiment can be adapted to a multiple traffic type circuit group. The following Table 3 is a threshold table for a circuit group of two traffic types.

TABLE 3

| Interval number | Time interval | Threshold d(t) |
|---|---|---|
| 1 | $s(0) = t_o \leq t < s(1)$ | $(b_1^{[1]}(1), b_1^{[2]}(1)), \ldots, (b_{j1}^{[1]}(1), b_{j1}^{[2]}(1))$ |
| 2 | $s(1) \leq t < s(2)$ | $(b_1^{[1]}(2), b_1^{[2]}(2)), \ldots, (b_{j2}^{[1]}(2), b_{j2}^{[2]}(2))$ |
| 3 | $s(2) \leq t < s(3)$ | $(b_1^{[1]}(3), b_1^{[2]}(3)), \ldots, (b_{j3}^{[1]}(3), b_{j3}^{[2]}(3))$ |
| ⋮ | ⋮ | ⋮ |
| m | $s(m-1) \leq t < s(m)$ | $(b_1^{[1]}(m), b_1^{[2]}(m)), \ldots, (b_{jm}^{[1]}(m), b_{jm}^{[2]}(m))$ |
| ⋮ | ⋮ | ⋮ |
| M | $s(M-1) \leq t \leq s(M) = T$ | $(b_1^{[1]}(M), b_1^{[2]}(M)), \ldots, (b_{jM}^{[1]}(M), b_{jM}^{[2]}(M))$ |

The two traffic types are for example a first type of telephone calls connected to the circuit group using a circuit capacity of 64 kbps and a second type of video telephone calls connected to the circuit group using a circuit capacity of 128 kbps.

If a new call of the first type or the second type is arrived at a circuit group G having a capacity of C with enough free capacity at a time t, the arriving new call will be connected to the group is occupying a necessary capacity. Thus, the number of calls of first type $n^{[1]}(t)$ or second type $n^{[2]}(t)$ in progress at the time t is increased by one. Contrary to this, if one of $n^{[1]}(t)$ or $n^{[2]}(t)$ calls in progress terminates, the number of corresponding calls $n^{[1]}(t)$ or $n^{[2]}(t)$ in progress at that time is decreased by one.

The target circuit group G and a target time T will be set beforehand in the adaptive traffic control device 10. Then, the thresholds d(t) at the respective points of time t from an initiation time $t_0$ to the target time T are calculated so that a probability of the number of calls $(n^{[1]}(T), n^{[2]}(T))$ at the target time T is controlled to $(n^{[1]}(T), n^{[2]}(T))=(k,l)$ where k and l are zero or a positive integer, respectively. The calculated thresholds d(t) are stored in the memory 101a in the first decision unit 101 as a threshold table (Table 3).

If a new call is arrived at the switching device 11 at an arbitrary time t ($t_0 \leq t \leq T$), this switching device 11 informs the adaptive traffic control device 10 of this arrival of the call and the number of calls $(n^{[1]}(t), n^{[2]}(t))$ in progress in the target circuit group G. The switching device 11 inquires the adaptive traffic control device 10 whether this new call should be accepted or rejected. By comparing the number of calls $(n^{[1]}(t), n^{[2]}(t))$ in progress in the group G with the two-dimensional threshold vector $(d^{[1]}(t), d^{[2]}(t))$ provided from the threshold table, the traffic control device 10 decides as follows.

If $n^{[1]}(t)<d^{[1]}(t)$ and $n^{[2]}(t)<d^{[2]}(t)$, the arriving call is to be accepted. If $n^{[1]}(t) \geq d^{[1]}(t)$ or $n^{[2]}(t) \geq d^{[2]}(t)$, the arriving call is to be rejected. This decision of the acceptance/rejection is informed to the switching device 11 as a final decision. The above-decision is executed for every arriving call until the time t reaches the target time T.

According to this embodiment as well as the former embodiment, acceptance and rejection of an arriving call can be selectively and adaptively controlled depending upon a connection state in the circuit group at each time whereas greater number of calls can be accepted than the conventional method. As a result, unnecessary rejections of the calls can be reduced to prevent unnecessary decrease in circuit utilization.

In the aforementioned embodiment, two state parameters $r^{[1]}$ and $r^{[2]}$ and their respective thresholds $v^{[1]}$ and $v^{[2]}$ for the first call type and the second call type may be prepared so that the rejection of all calls of respective types are independently controlled.

Figure 7:
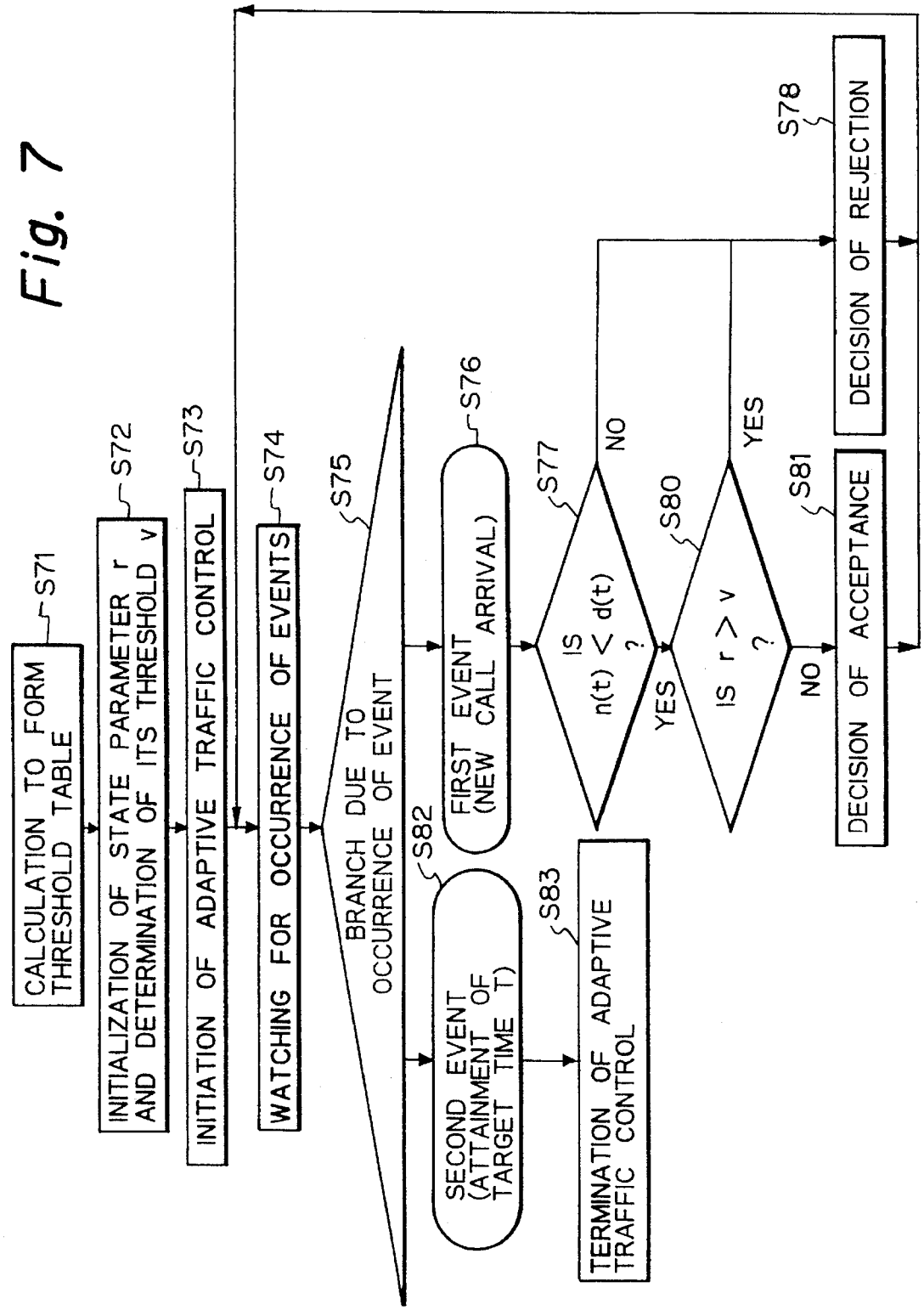
FIG. 7 shows a flow chart of a control algorithm according to an another embodiment which is a modification of the embodiment shown in FIG. 1.

FIG. 7 shows a flow chart of a control algorithm according to an another embodiment which is a modification of the embodiment shown in FIG. 1. The constitution of an adaptive traffic control device 10 and a switching device 11 are the same as that of the embodiment of FIG. 1. Therefore, only operation of this embodiment will be described in detail with reference to FIG. 7.

At first, a target circuit group G and a target time T are set in the control device 10. Then, the calculation unit 103 calculates admissible numbers of calls, or thresholds, d(t) at the respective points of time t from an initiation time $t_0$ to the target time T so that a probability of the number of calls (n(T)) at the target time T is controlled to (n(T))=(j) where j is zero or a positive integer (step S71). The calculated thresholds d(t) are stored in the memory 101a in the first decision unit 101 as a threshold table (Table 1). The above calculation for producing the threshold table can be carried out or modified any time before the time t.

If it is known beforehand or it can be assumed practically that the call arrival at the target circuit group G is Poissonian with rate λ during the interval from the initiation time $t_0$ to the target time T, the thresholds will be calculated based upon the aforementioned strategy A. Regardless of call arrival process, if it is practically assumed that the service time is exponentially distributed with service rate μ, the thresholds will be calculated based upon the aforementioned strategy B.

Next a state parameter r used for deciding the rejection of all the calls is initialized. In this embodiment, the state parameter r is an elapsed time period from the initiation time $t_0$, which can be obtained from the timer 104. Also, an upper bounding threshold v of the parameter r, which represents an initiation time for rejection of all calls, is determined beforehand to a proper time value (step S72). Then, the adaptive traffic control is initiated (step S73). This traffic control initiation time is indicated as $t_0$. Thereafter, occurrence of events is watched (step S74).

There are two possible types of the events (first and second events) in this embodiment. Namely, the first event is a new call arrival and the second event is the attainment of a target time T. If a new call is arrived at the switching device 11 at an arbitrary time t ($t_0 \leq t \leq T$), namely if the first event occurs, this switching device 11 informs the adaptive traffic control device 10 of this arrival of the call and the number of calls in progress n(t) in the target circuit group G which is connected to the device 11 and subjected to control its calls (steps S75 and S76). Also the switching device 11 inquires the adaptive traffic control device 10 whether this new call should be accepted or rejected. It should be noted that the switching device 11 always knows the number of calls in progress n(t) in the circuit group G as well as an ordinary automatic switching device.

When an inquiry of rejection/acceptance of the new arriving call is received, the adaptive traffic control device 10 sets the number of calls in progress n(t) at the time t in the circuit group G into the first register 101b in the first decision unit 101. The decision unit 101 reads out a threshold, or an admissible number, of calls d(t) at that time t in the target circuit group G from the threshold table in the memory 101a and stores the read-out threshold d(t) into the second register 101c. The first comparison/decision circuit 101d compares the content n(t) in the first register 101b with the content d(t) in the second register 101c, and decides as follows in accordance with the comparison (step S77). If n(t)<d(t), the arriving call is to be accepted, and if n(t)≥d(t), the arriving call is to be rejected. This decision of the acceptance/rejection is informed to the second decision unit 102.

If the decision is the rejection of the call, the second decision unit 102 informs the switching device 11 of this decision of rejection as a final decision (step S78).

If the decision from the first decision unit 101 is the acceptance of the call, the comparison/decision circuit 102c in the second decision unit 102 compares the state parameter r read out from the timer 104 and stored in the third register 102a with the upper bounding threshold v stored beforehand in the fourth register 102b, and decides as follows in accordance with the comparison (step S80). If r≤v, the arriving call is to be accepted (step S11), and this decision of the acceptance is informed to the switching device 11 as a final decision. If r>v, it is decided that all the arriving call is to be rejected (step S78). Namely, after this time t to the target time T, all the arriving calls are rejected without reserve. This decision of the rejection is also informed to the switching device 11 as a final decision.

If the time t reach the target time T (step S82), namely if the second event occurs, the above-mentioned adaptive traffic control is terminated (step S83).

The upper bounding threshold v of the state parameter r, which represent the initiation for rejection of all calls, can be determined optionally. Before this initiation time, arriving calls are adaptively controlled, and after the initiation time, all the arriving calls are rejected without reserve.

According to this embodiment, also, acceptance and rejection of an arriving call can be selectively and adaptively controlled depending upon a connection state in the circuit group at each time whereas greater number of calls can be accepted than the conventional method. As a result, unnecessary rejections of the calls can be reduced to prevent unnecessary decrease in circuit utilization.

It is apparent that the above-mentioned embodiment can be also adapted to a multiple traffic type circuit group. In this case, multiple state parameters and their thresholds for respective call types may be prepared so that the rejection of all calls of respective types are independently controlled.

Figure 8:
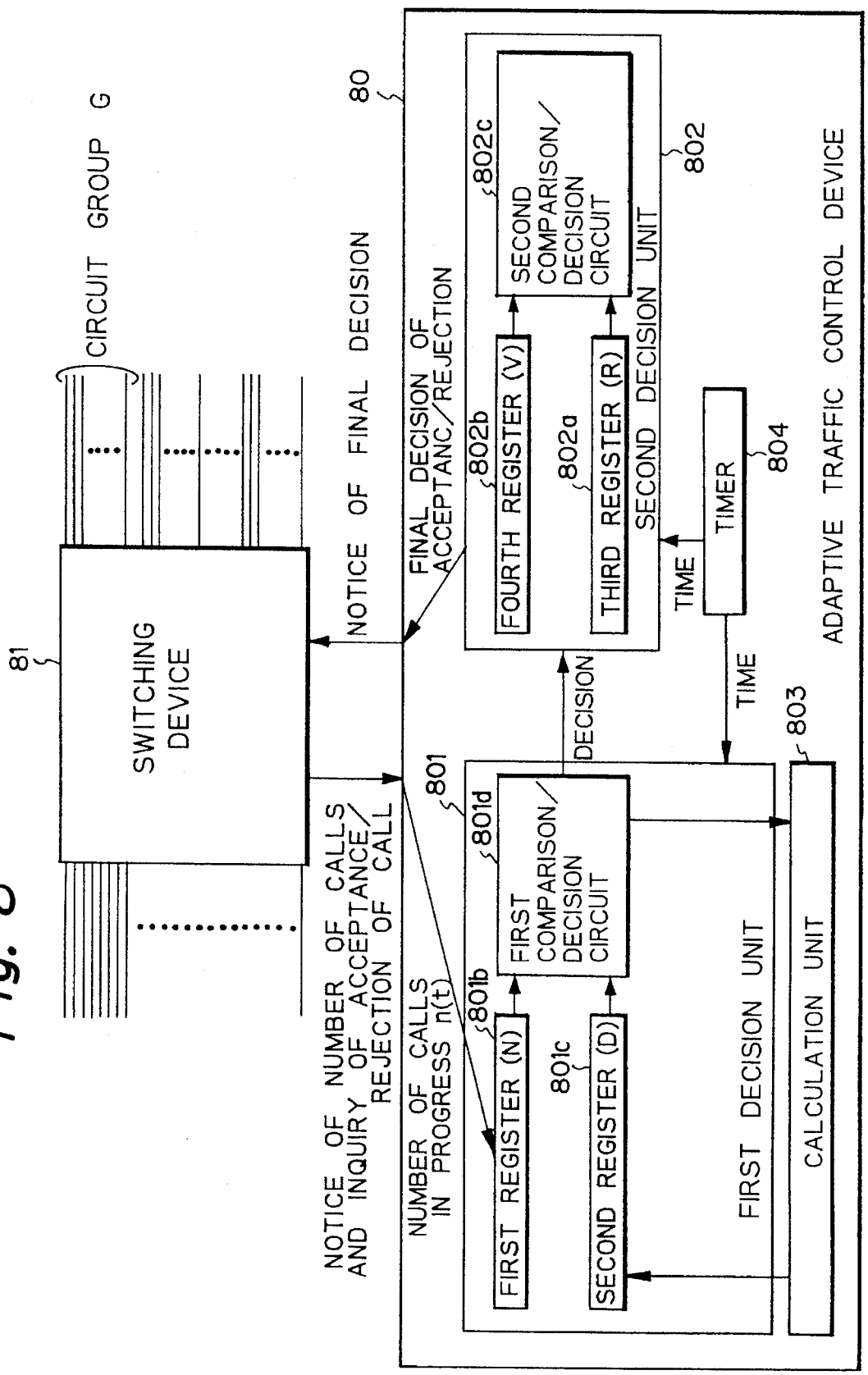
FIG. 8 shows a block diagram of an another embodiment of an adaptive traffic control apparatus according to the present invention.

FIG. 8 shows a schematic constitution of an adaptive traffic control apparatus as a further embodiment according to the present invention. In this figure, a reference numeral 80 denotes the adaptive traffic control apparatus connected to a switching device 81 adapted for a plurality of circuit groups including a target circuit group G. The adaptive traffic control apparatus 80 in this embodiment is substantially constituted by a first decision unit 801 for determining rejection/acceptance of each call arrived at the target circuit group G, a second decision unit 802 for determining rejection of all the calls, a calculation unit 803 for calculating admissible number of calls, or thresholds, at each time a new call arrives, and a timer 804.

The first decision unit 801 has a first register (N) 801b for temporally storing the number of calls in progress n(t) at an arbitrary time t provided from the switching device 81, a second register (D) 801c for temporally storing the admissible number of calls d(t) at the arbitrary time t, which is fed from the calculation unit 803, and a first comparison/decision circuit 801d for comparing the contents in the first and second registers 801b and 801c.

The second decision unit 802 has a third register (R) 802a for temporally storing a state parameter r used for deciding the rejection of all the calls, a fourth register (V) 802b for temporally storing an upper bounding threshold v of the parameter r, and a second comparison/decision circuit 802c for comparing the contents in the third and fourth registers 802a and 802b.

Operation of this embodiment will be described in detail with reference to FIG. 9 which shows a flow chart of a control algorithm of this embodiment.

At first, the target circuit group G and the target time T are set in the control device 80. Then, the state parameter r used for deciding the rejection of all the calls is initialized, and the upper bounding threshold v of the parameter r is determined beforehand to a proper value (step S91). Then, the adaptive traffic control is initiated (step S92). This traffic control initiation time is indicated as $t_0$. Thereafter, occurrence of events is watched (step S93).

There are two possible types of the events (first and second events) in this embodiment. Namely, the first event is a new call arrival and the second event is the attainment of a target time T. If a new call is arrived at the switching device 81 at an arbitrary time t ($t_0 \leq t \leq T$), namely if the first event occurs, this switching device 81 informs the adaptive traffic control device 80 of this arrival of the call and the number of calls in progress n(t) in the target circuit group G which is connected to the device 81 and subjected to control its calls (steps S94 and S95). Also the switching device 81 inquires the adaptive traffic control device 80 whether this new call should be accepted or rejected. It should be noted that the switching device 81 always knows the number of calls in progress n(t) in the circuit group G as well as an ordinary automatic switching device.

When an inquiry of rejection/acceptance of the new arriving call is received, the adaptive traffic control device 80 sets the number of calls in progress n(t) at the time t in the circuit group G into the first register 801b in the first decision unit 801. Also, the calculation unit 803 calculates admissible numbers of calls, or thresholds, d(t) at the time t so that a probability of the number of calls (n(T)) at the target time T is controlled to (n(T))=(j) where j is zero or a positive integer (step S96). The calculated threshold d(t) of call at that time t in the target circuit group G is stored into the second register 801c.

If it is known beforehand or it can be assumed practically that the call arrival at the target circuit group G is Poissonian with rate λ during the interval from the initiation time $t_0$ to the target time T, the thresholds will be calculated based upon the aforementioned strategy A. Regardless of call arrival process, if it is practically assumed that the service time is exponentially distributed with service rate μ, the thresholds will be calculated based upon the aforementioned strategy B. The first comparison/decision circuit 801d compares the content n(t) in the first register 801b with the content d(t) in the second register 801c, and decides as follows in accordance with the comparison (step S97). If n(t)<d(t), the arriving call is to be accepted, and if n(t)≧d(t), the arriving call is to be rejected. This decision of the acceptance/rejection is informed to the second decision unit 802.

If the decision is the rejection of the call, the second decision unit 802 informs the switching device 81 of this decision of rejection as a final decision (step S98). Then, the state parameter r is updated, namely incremented (step S99). This state parameter r is resident in the third register 802a.

If the decision from the first decision unit 801 is the acceptance of the call, the comparison/decision circuit 802c in the second decision unit 802 compares the state parameter r stored in the third register 802a with the upper bounding threshold v stored beforehand in the fourth register 802b, and decides as follows in accordance with the comparison (step S100). If r≦v, the arriving call is to be accepted (step S101), and this decision of the acceptance is informed to the switching device 81 as a final decision. If r>v, it is decided that all the arriving call is to be rejected (step S98). Namely, after this time t to the target time T, all the arriving calls are rejected without reserve. This decision of the rejection is also informed to the switching device 81 as a final decision.

If the time t reach the target time T (step S102), namely if the second event occurs, the above-mentioned adaptive traffic control is terminated (step S103).

The upper bounding threshold v of the state parameter r can be determined optionally. However, in the strategy B, this threshold is determined to v=0 and the state parameter is initialized to r=1. Namely, once it is judged as n(t)+1≧d(t), only the arrived call at this time t will be accepted but all the arriving calls after that time till the target time T will be rejected without reserve.

If it is desired that the decision for the rejection of all the arriving calls without reserve is performed depending upon a plurality of factors, the state parameter r and the threshold v should be defined as vectors constituted by a plurality of the factors, and the state parameter value and its threshold value with respect to a specified factor or factors should be compared with each other.

According to this embodiment, acceptance and rejection of an arriving call can be selectively and adaptively controlled depending upon a connection state in the circuit group at each time whereas greater number of calls can be accepted than the conventional method. As a result, unnecessary rejections of the calls can be reduced to prevent unnecessary decrease in circuit utilization.

It is apparent that the above-mentioned embodiment can be also adapted to a multiple traffic type circuit group.

The present invention can be adapted to a traffic control, in reallocation of virtual path in ATM networks, for reducing the number of calls in progress in the virtual path without changing the capacity of the virtual path. In this case, the virtual path will correspond to the circuit group G and a threshold table for multiple traffic types similar to Table 3 will be used. Another constitution and operation of this case is substantially the same as these of the aforementioned embodiments. According to the present invention, an initiation of circuit blocking of the virtual path can be adaptively and selectively controlled depending upon the state of connected calls in the virtual path and upon the scheduled time T. Thus, greater number of calls can he accepted than the conventional method. As a result, unnecessary rejections of the calls can be reduced to prevent unnecessary decrease in circuit utilization.

The adaptive traffic control technique according to the present invention can be adapted to switching circuit groups receiving logical communication circuits such as the aforementioned ATM networks, and to switching circuit groups for enqueuing arriving calls before their connection.

The adaptive traffic control technique according to the present invention can be further adapted to not only traffic control of telecommunication networks but also various systems wherein different users utilize common resources, for example job acceptance control in computer systems.

Many widely different embodiments of the present invention may be constructed without departing from the spirit and scope of the present invention. It should be understood that the present invention is not limited to the specific embodiments described in the specification, except as defined in the appended claims.

What is claimed is:

1. An adaptive traffic control apparatus for controlling connection of arriving calls in at least one circuit group in switching networks, said switching networks measuring a number of calls in progress $n(t)$ at a time t in said at least one circuit group, where $t_0 \leq t \leq T$, $t_0$ is a traffic control initiation time and T is a target time of the traffic control, said apparatus comprising:

means for calculating an admissible number of calls $d(t)$ in said at least one circuit group at the time t so that all circuits of said at least one circuit group will be free by the target time T; and means for comparing said measured number of calls in progress $n(t)$ with said calculated admissible number of calls $d(t)$ at each time a new call arrives at said at least one circuit group to decide that said arriving new call is to be accepted if $n(t)<d(t)$ and that said arriving new call is to be rejected if $n(t) \geq d(t)$.

2. The apparatus as claimed in claim 1, wherein said calculating means includes a calculation unit for calculating beforehand a plurality of admissible numbers of calls $d(t)$ in said at least one circuit group at points of time from the traffic control initiation time $t_0$ to the target time T, and wherein said apparatus further comprises a memory for storing the calculated admissible numbers of calls as a threshold table.

3. The apparatus as claimed in claim 1, wherein said calculating means includes a calculation unit for calculating an admissible number of calls $d(t)$ in said at least one circuit group at a time t every time a new call arrives.

4. The apparatus as claimed in claim 1, wherein said calculating means includes means for calculating the admissible number of calls $d(t)$ in said at least one circuit group at the time t so that all the circuits of said at least one circuit group will be free by the target time T, while satisfying a success probability depending upon both an average service time of one call and the number of arriving calls during a unit of time in case that the call arrival during the interval from the traffic control initiation time $t_0$ to the target time T is regarded as Poissonian.

5. The apparatus as claimed in claim 1, wherein said calculating means includes means for calculating the admissible number of calls $d(t)$ in said at least one circuit group at the time t so that all the circuits of said at least one circuit group will be free by the target time T, while satisfying a success probability depending upon only an average service time of one call.

6. The apparatus as claimed in claim 5, wherein said apparatus further comprises means for rejecting all arriving calls without reserve after a time once said arriving new call is decided to be rejected.

7. The apparatus as claimed in claim 1, wherein said apparatus further comprises means for rejecting all arriving calls without reserve after a time that a state parameter r exceeds a predetermined threshold v.

8. The apparatus as claimed in claim 7, wherein said apparatus further comprises means for updating the state parameter r every time a new call arrives at said at least one circuit group.

9. The apparatus as claimed in claim 7, wherein said apparatus further comprises means for updating the state parameter r every time a rejection of the arriving call is decided.

10. The apparatus as claimed in claim 7, wherein said apparatus further comprises means for updating the state parameter r every time an acceptance of the arriving call is decided.

11. The apparatus as claimed in claim 7, wherein the state parameter r is an elapsed time period from the initiation time $t_0$.

12. An adaptive traffic control method for controlling connection of arriving calls in at least one circuit group in switching networks, said switching networks measuring a number of calls in progress $n(t)$ at a time t in said at least one circuit group, where $t_0 \leq t \leq T$, $t_0$ is a traffic control initiation time and T is a target time of the traffic control, said method comprising the steps of:

calculating an admissible number of calls $d(t)$ in said at least one circuit group at the time t so that all the circuits of said at least one circuit group will be free by the target time T; and comparing said measured number of calls in progress $n(t)$ with said calculated admissible number of calls $d(t)$ at each time a new call arrives at said at least one circuit group to decide that said arriving new call is to be accepted if $n(t)<d(t)$ and that said arriving new call is to be rejected if $n(t) \geq d(t)$.

13. The method as claimed in claim 12, wherein said calculating step includes a step of calculating beforehand a plurality of admissible numbers of calls d(t) in said at least one circuit group at points of time from the traffic control initiation time $t_0$ to the target time T, and wherein said method further comprises a step of storing the calculated admissible numbers of calls as a threshold table.

14. The method as claimed in claim 12, wherein said calculating step includes a step of calculating an admissible number of calls d(t) in said at least one circuit group at a time t every time a new call arrives.

15. The method as claimed in claim 12, wherein said calculating step includes a step of calculating the admissible number of calls d(t) in said at least one circuit group at the time t so that all the circuits of said at least one circuit group will be free by the target time T, while satisfying a success probability depending upon both an average service time of one call and the number of arriving calls during a unit of time in case that the call arrival during the interval from the traffic control initiation time $t_0$ to the target time T is regarded as Poissonian.

16. The method as claimed in claim 12, wherein said calculating step includes a step of calculating the admissible number of calls d(t) in said at least one circuit group at the time t so that all the circuits of said at least one circuit group will be free by the target time T, while satisfying a success probability depending upon only an average service time of one call.

17. The method as claimed in claim 16, wherein said method further comprises a step of rejecting all arriving calls without reserve after a time once said arriving new call is decided to be rejected.

18. The method as claimed in claim 12, wherein said method further comprises a step of rejecting all arriving calls without reserve after a time that a state parameter r exceeds a predetermined threshold v.

19. The method as claimed in claim 18, wherein said method further comprises a step of updating the state parameter r every time a new call arrives at said at least one circuit group.

20. The method as claimed in claim 18, wherein said method further comprises a step of updating the state parameter r every time a rejection of the arriving call is decided.

21. The method as claimed in claim 18, wherein said method further comprises a step of updating the state parameter r every time an acceptance of the arriving call is decided.

22. The method as claimed in claim 18, wherein the state parameter r is an elapsed time period from the initiation time $t_0$.

* * * * *

UNITED STATES PATENT AND TRADEMARK OFFICE
CERTIFICATE OF CORRECTION

PATENT NO. : 5,521,905
DATED : May 28, 1996
INVENTOR(S) : ODA et al.

It is certified that error appears in the above-indentified patent and that said Letters Patent is hereby corrected as shown below:

On the title page:

Item [73], please delete "Kakusai" insert therefor -- Kokusai --

Signed and Sealed this

Third Day of June, 1997

Attest:

BRUCE LEHMAN

Attesting Officer

Commissioner of Patents and Trademarks